3,215,530
COLOR PHOTOGRAPHIC ELEMENT PROTECTED AGAINST FADING AND METHOD OF APPLYING PROTECTIVE FILM THERETO
Alexander Riebel, Leverkusen, Alfons Klein, Dusseldorf, and Rudolf Stroh and Hans Ulrich, Leverkusen, Germany, assignors to Agfa Aktiengesellschaft, Leverkusen, Germany, a corporation of Germany
No Drawing. Filed Oct. 31, 1961, Ser. No. 148,846
Claims priority, application Germany, Nov. 16, 1960, A 36,050
3 Claims. (Cl. 96—48)

The present invention relates to an anti-fading layer by means of which color photographs may be protected against the color-fading action of daylight, in particular of sunlight.

It is known that an improved fastness to light may be obtained by applying or incorporating a substance which absorbs in the long-wave ultraviolet range into one or more layers of a photographic material containing gelatin. It is further known that water-soluble substances absorbing in the ultraviolet region may be incorporated into the finished print by an anti-fading bath or that alternatively the finished prints may be coated with an anti-fading layer containing a substance which absorbs in the ultraviolet region.

Ultraviolet radiation-absorbing compounds (referred to hereafter also as "UV-absorbents" and antifading agents) which are used for photographic purposes are generally the same compounds that are used in the plastics industry, for example, hydroxybenzophenone, monoazo compounds, xenylamine (4-biphenylamine), fluorenone, benzalmethylphenyl hydrazone, cyanine dyes and N,N'-bis-(sulfosalicyloyl)benzidine (which is also known as 4,4'-bis(sulfosalicyloylamino)diphenyl), derivatives of higher aromatic hydrocarbons, etc.

These compounds may be used in their original form or in the form of a diffusion-resistant water-soluble derivative containing a fatty acid radical. It is also known to apply such water-soluble UV-absorbents together with a film-forming substance in the form of an aqueous solution or dispersion onto a photographic material or to apply a solution of suitable UV-absorbents and film-forming substances in organic solvents onto color photographs. However, all these methods have various disadvantages; for example, the water-soluble and diffusion-resistant absorbents have their molar absorption reduced by the fatty radical, and thus provide insufficient protection. Other water-soluble compounds which are not resistant to diffusion may diffuse from the surface into deeper layers and even down to the paper support, thereby reducing the protective action on the surface. Moreover, these substances may easily be washed out by a subsequent washing. Water-insoluble absorbents applied by means of film-forming substances are usually not sufficiently soluble in film-forming substances and tend to crystallize therein. They can therefore be used only in relatively low concentrations. Finally, film-forming substances have varying and usually poor adhesion to gelatin and can therefore peel off by the action of water or by mechanical action.

It is among the objects of the present invention to provide anti-fading layers for color photographic images, thus providing images which have improved stability against the action of artificial light and daylight. Other objects will be apparent from the following description.

We have found that substituted hydroxybenzophenones serve as very useful anti-fading agents in combination with the copolymers described below. The ultravoilet radiation-absorbing compounds or antifading agents that are used in accordance with our invention have the following general formula:

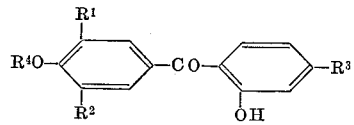

In this formula $R^1$ and $R^2$ which may be alike or different represent a tertiary butyl or isopropyl group, $R^3$ is hydrogen or an alkoxy group having 1–5 carbon atoms and $R^4$ represents hydrogen or an alkyl group, having 1–5 carbon atoms.

These anti-fading agents can be readily prepared according to the method described in Example 1 hereinafter.

Among the benzophenone derivatives which can be used are the following:

2,4'-dihydroxy-3',5'-di-tertiary-butyl-benzophenone
2,4'-dihydroxy-3',5'-di-isopropyl-benzophenone
2,4'-dihydroxy-3'-tertiary-butyl-5'-isopropyl-benzophenone
2,4'-dihydroxy-4-methoxy-3',5'-di-tertiary-butyl-benzophenone
2,4'-dihydroxy-4-methoxy-3',5'-di-isopropyl-benzophenone
2,4'-dihydroxy-4-ethoxy-3',5'-di-isopropyl-benzophenone
2,4'-dihydroxy-4-propoxy-3',5'-di-isopropyl-benzophenone
2,4'-dihydroxy-4-pentoxy-3',5'-di-isopropyl-benzophenone
4,4'-dimethoxy-2-hydroxy-3',5'-di-tertiary-butyl-benzophenone
4,4'-diethoxy-2-hydroxy-3',5'-di-tertiary-butyl-benzophenone
4-butoxy-4'-methoxy-2-hydroxy-3',5'-di-tertiary-butyl-benzophenone
4-methoxy-4'-butoxy-2-hydroxy-3',5'-di-isopropyl-benzophenone.

A great advantage of the anti-fading agents of this invention resides in the features that they have a very good solubility in the copolymers described below which are used as binding agents for the anti-fading layers. Thus these compounds do not crystallize even when the layer is completely dried.

It is possible to obtain a clear, transparent layer which contains up to 30 percent of the UV-absorbent and which affords excellent protection against light. Accordingly, it is possible to obtain adequate protection by application of relatively thin anti-fading layers.

Binding agents containing the anti-fading agents described hereinbefore which can be used include copolymers of maleic anhydride with vinyl alkyl ethers, the alkyl groups of which contain up to 5 carbon atoms. Vinyl alkyl ethers which may be used in the production of such copolymers with maleic anhydride include, for example, vinyl n-butyl ether, vinyl isobutyl ether and vinyl propyl ether. Said copolymers may contain the two components in a molecular ratio between 0.5:1 and 1.5:1 of maleic anhydride to vinyl alkyl ether preferably, however, about 1:1. The preparation of the copolymers is accomplished according to Example 1, using a conventional polymerization catalyst.

Such copolymers are easily soluble in organic solvents such as ethyl acetate or ketones.

These anti-fading layers show an excellent adhesion to the gelatin layer of the color photographic image which is probably due to the anhydride groupings of the binding agent. It is a particular advantage of these layers that the adhesion power is independent of the moisture content of the gelatin layer, which may vary within wide limits according to the climatic conditions to which the color photographic image to be treated has been subjected.

Solutions of the binding agent and the UV-absorbent in ketones, for example, diethyl ketone, are completely compatible with fluorine-containing halogenated hydrocarbons such as are known under the trademark Freon which are generally used as propellants in aerosol bombs or dispensers.

EXAMPLE 1

23 g. of a film-forming agent consisting of the copolymer of vinyl butyl ether and maleic anhydride whose preparation is described hereinafter are dissolved in 230 ml. of distilled diethyl ketone with moderate heating. After cooling, 7.0 g. of 2,4'-dihydroxy-3',5'-di-tertiary butyl benzophenone prepared as described hereinafter are added and the solution is filtered through a cloth. This solution is cast onto color photographs. The resulting anti-fading layer having a thickness of between 2 and 20 microns shows no blushing even after several weeks' storage.

When the 2,4'-dihydroxy-3',5'-di-tertiary butyl benzophenone in the foregoing example is replaced by each of 2,4'-dihydroxy benzophenone and 2,4'-dihydroxy-3',5'-diethyl benzophenone the resulting films deposited on the color photographs show blushing and the formation of patches of precipitated benzophenone compound as early as 1 to 2 weeks of storage at room temperature.

Preparation of the copolymer 30 g. of distilled vinyl butyl ether, 36 g. of maleic acid anhydride and 0.07 g. of benzoyl peroxide $[C_6H_5CO)_2O_2]$ are dissolved in 100 ml. of dry and pure methyl acetate. 20 percent of the solution is heated to the boiling point of the mixture in a nitrogen atmosphere on a water bath at 60 to 70° C. and the remaining 80 percent is added while stirring and refluxing gently for 4 hours. After addition is complete, stirring and refluxing is continued for 2 more hours. Thereafter, the solution is stirred into benzene, whereupon the copolymer precipitates. The product is purified by redissolving it in methyl acetate and reprecipitating by stirring into benzene.

Preparation of 2,4'-dihydroxy-3',5'-di-tertiary butyl benzophenone 200 g. of aluminum chloride are added in portions to a solution of 206 grams of 2,6-ditertiary butyl phenol and 170.4 grams of 2-methoxybenzoyl chloride in 700 cc. of nitrobenzene with cooling. The temperature should not exceed +15° C. Thereafter, the mixture is stirred for 2 hours at room temperature. After adding 600 cc. benzene and refluxing for 1½ hours, the reaction product is decomposed with cold water. The organic phase is extracted by shaking several times with dilute sodium hydroxide, whereby the 2,4'-dihydroxy-3',5'-ditertiary butyl benzophenone is extracted in the form of its water-soluble sodium salt. After acidifying this solution and recrystallizing the precipitated crystals from ligroin, a yield of 204 g. is obtained. Melting point 125–127° C.

EXAMPLE 2

An anti-fading layer is produced as described in Example 1 except that the dihydroxyditertiary-butyl-benzophenone is replaced by an equimolar quantity of 2,4'-dihydroxy-3,5'-di-isopropyl benzophenone.

Color photographic images coated with this layer as described in Example 1 remain unaltered after storing for 1–2 weeks at room temperature.

EXAMPLE 3

An anti-fading layer is prepared as described in Example 1 except that the dihydroxy-ditertiary-butylbenzophenone is replaced by an equimolar quantity of 2,4'-dihydroxy-4-methoxy-3',5'-di-isopropyl-benzophenone.

Color photographic images coated with this layer as described in Example 1 remain unchanged after storing for several weeks at room temperature.

EXAMPLE 4

An anti-fading layer is prepared as described in Example 1 except that the dihydroxy-ditertiary-butylbenzophenone is replaced by an equimolar quantity of 2,4'-dihydroxy-4-methoxy-3',5'-ditertiarybutylbenzophenone.

Color photographic images coated with this layer as described in Example 1 remain unchanged after storing for several weeks at room temperature.

EXAMPLE 5

An anti-fading layer is prepared as described in Example 1 except that the dihydroxy-ditertiary-butylbenzophenone is replaced by an equimolar quantity of 4,4'-dimethoxy-2-hydroxy-3',5'-ditertiary butylbenzophenone.

Color photographic images coated with this layer as described in Example 1 remain unchanged after storing for several weeks at room temperature.

What is claimed is:

1. A method of preventing image degradation in a finished color photographic element comprising a support and superposed thereon a plurality of developed and fixed photographic emulsion layers containing coupled-dye images, at least one of the said dye images being subject to fading by the action of ultraviolet radiation, which comprises applying to the said photographic element from a nonaqueous solution a film of a film-forming copolymer of maleic anhydride and a vinyl alkyl ether, the alkyl group of which contains up to 5 carbon atoms, in a molecular ratio between 0.5:1 and 1.5:1 of maleic anhydride to the vinyl alkyl ether, containing an effective amount of an ultraviolet radiation-absorbing compound of the group consisting of hydroxy-substituted benzophenones having the formula

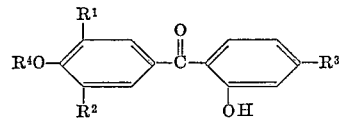

in which

R¹ and R² are each a radical of the group consisting of isopropyl and tertiary butyl, R³ is a radical of the group consisting of hydrogen and alkoxy containing up to 5 carbon atoms, and R⁴ is a radical of the group consisting of hydrogen and alkyl containing up to 5 carbon atoms.

2. A finished color photographic element comprising a support and superposed thereon a plurality of developed and fixed photographic emulsion layers containing coupled-dye images, at least one of the said dye images being susceptible to fading by the action of ultraviolet radiation, and superposed on the top layer thereof, a film of film-forming copolymer of maleic anhydride and a vinyl alkyl ether, the alkyl group of which contains up to 5 carbon atoms, in a molecular ratio between 0.5:1 and 1.5:1 of maleic anhydride to the vinyl alkyl ether, and containing an effective amount of an ultraviolet radiation-absorbing compound of the group consisting of hydroxy-substituted benzophenones having the formula

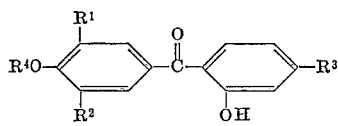

in which

R¹ and R² are each a radical of the group consisting of isopropyl and tertiary butyl, R³ is a radical of the group consisting of hydrogen and alkoxy containing up to 5 carbon atoms, and R⁴ is a radical of the group consisting of hydrogen and alkyl containing up to 5 carbon atoms.

3. A finished color photographic element as defined in claim 2 in which the film-forming copolymer is a copolymer of maleic anhydride and vinyl butyl ether in the molar ratio of about 1:1.

References Cited by the Examiner

UNITED STATES PATENTS

| | | | |
|---|---|---|---|
| 2,694,697 | 11/54 | Grosser | 96—84 |
| 2,719,086 | 9/55 | Sawdey et al. | 96—11 |
| 2,875,053 | 2/59 | Minsk | 96—84 |
| 3,008,995 | 11/61 | Hoeschele et al. | 260—45.95 |
| 3,050,500 | 8/62 | Sherwood | 260—45.95 |
| 3,105,094 | 9/63 | Hoeschele | 260—45.95 |

FOREIGN PATENTS 599,206  5/60  Canada.

HAROLD N. BURSTEIN, *Examiner.*

NORMAN G. TORCHIN, *Primary Examiner.*